United States Patent
Suzuki

(10) Patent No.: US 11,148,660 B2
(45) Date of Patent: Oct. 19, 2021

(54) VEHICLE TURNING CONTROL APPARATUS

(71) Applicant: NTN CORPORATION, Osaka (JP)

(72) Inventor: Yuta Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 238 days.

(21) Appl. No.: 16/344,225

(22) PCT Filed: Oct. 23, 2017

(86) PCT No.: PCT/JP2017/038147
§ 371 (c)(1),
(2) Date: Apr. 23, 2019

(87) PCT Pub. No.: WO2018/079469
PCT Pub. Date: May 3, 2018

(65) Prior Publication Data
US 2019/0241176 A1    Aug. 8, 2019

(30) Foreign Application Priority Data

Oct. 28, 2016    (JP) .............................. JP2016-211425

(51) Int. Cl.
*B60W 30/045*    (2012.01)
*B60W 40/064*    (2012.01)
(Continued)

(52) U.S. Cl.
CPC ............. *B60W 30/045* (2013.01); *B60L 9/18* (2013.01); *B60L 15/20* (2013.01); *B60T 8/172* (2013.01);
(Continued)

(58) Field of Classification Search
CPC .. B60W 30/045; B60W 30/02; B60W 40/064; B60W 40/068; B60W 40/114;
(Continued)

(56) References Cited

U.S. PATENT DOCUMENTS

| 5,513,907 | A | * | 5/1996 | Kiencke | ............. B60G 17/0195 180/197 |
| 6,615,124 | B1 | | 9/2003 | Adachi | |
| 6,708,088 | B2 | | 3/2004 | Matsuno et al. | |
| 2002/0153770 | A1 | * | 10/2002 | Matsuno | ............... B60W 10/14 303/146 |

FOREIGN PATENT DOCUMENTS

| JP | 2000-289595 | 10/2000 |
| JP | 2001-354131 | 12/2001 |

(Continued)

OTHER PUBLICATIONS

T. L. Lam, H. Qian and Y. Xu, "Direct yaw moment control for four wheel independent steering and drive vehicles based on centripetal force detection," 2012 IEEE International Conference on Robotics and Automation, 2012, pp. 103-108, doi: 10.1109/ICRA.2012.6224849 (Year: 2012).*

(Continued)

*Primary Examiner* — Kelly D Williams

(57) ABSTRACT

This vehicle turning control device controls the turning characteristic of a vehicle having braking/driving sources capable of independently controlling a braking/driving torque for each wheel. The vehicle turning control device includes a yaw moment control device for controlling a yaw moment occurring in the vehicle, and a slip determination device for determining a road surface state from the angular velocity and the angular acceleration of the wheel and the vehicle speed. The yaw moment control device includes a control gain calculator for calculating a control gain, a target yaw rate calculator for calculating a target yaw rate from the vehicle speed, the steering angle, and the control gain, and a yaw moment calculator for calculating the braking/driving torque for each wheel in accordance with the target yaw rate. The control gain calculator calculates the control gain on the basis of a determination result of the slip determination device.

5 Claims, 10 Drawing Sheets

(51) Int. Cl.
*B60W 40/068* (2012.01)
*B60W 40/114* (2012.01)
*B60T 8/172* (2006.01)
*B60T 8/1755* (2006.01)
*B60L 9/18* (2006.01)
*B60L 15/20* (2006.01)
*B60W 30/02* (2012.01)
*B60W 50/00* (2006.01)

(52) U.S. Cl.
CPC ......... *B60T 8/17551* (2013.01); *B60W 30/02* (2013.01); *B60W 40/064* (2013.01); *B60W 40/068* (2013.01); *B60W 40/114* (2013.01); B60W 2050/0022 (2013.01); B60W 2520/10 (2013.01); B60W 2520/26 (2013.01); B60W 2520/28 (2013.01); B60W 2540/18 (2013.01); B60W 2552/40 (2020.02); B60W 2720/14 (2013.01); B60W 2720/30 (2013.01); *Y02T 10/72* (2013.01)

(58) Field of Classification Search
CPC ..... B60W 2552/40; B60W 2050/0022; B60W 2540/18; B60W 2520/28; B60W 2520/26; B60W 2720/14; B60W 2720/30; B60W 2520/10; B60L 15/20; B60L 9/18; B60T 8/172; B60T 8/17551; Y02T 10/72
See application file for complete search history.

(56) References Cited

FOREIGN PATENT DOCUMENTS

| JP | 2001354131 A | * | 12/2001 |
| JP | 2002-316546 | | 10/2002 |
| JP | 2011-20584 | | 2/2011 |
| JP | 2016-20168 | | 2/2016 |
| JP | 2017-210018 | | 11/2017 |

OTHER PUBLICATIONS

Zhang Huan-huan, Xiang Xu'ai, Ye Kebao and Yang Guoping, "Research on torque distribution for an electric vehicle with in-wheel motors," 2014 IEEE Conference and Expo Transportation Electrification Asia-Pacific (ITEC Asia-Pacific), 2014, pp. 1-6, doi: 10.1109/ITEC-AP.2014.6940809 (Year: 2014).*
Extended European Search Report dated Jul. 24, 2020, in corresponding European Patent Application No. 17863371.5.
English Translation by WIPO of the International Preliminary Report on Patentability dated May 9, 2019 in corresponding International Patent Application No. PCT/JP2017/038147 (7 pages).
Japanese Decision of Grant dated Apr. 10, 2018 in corresponding Japanese Application No. 2016-211425.
International Search Report dated Dec. 26, 2017 in corresponding International Application No. PCT/JP2017/038147.

* cited by examiner

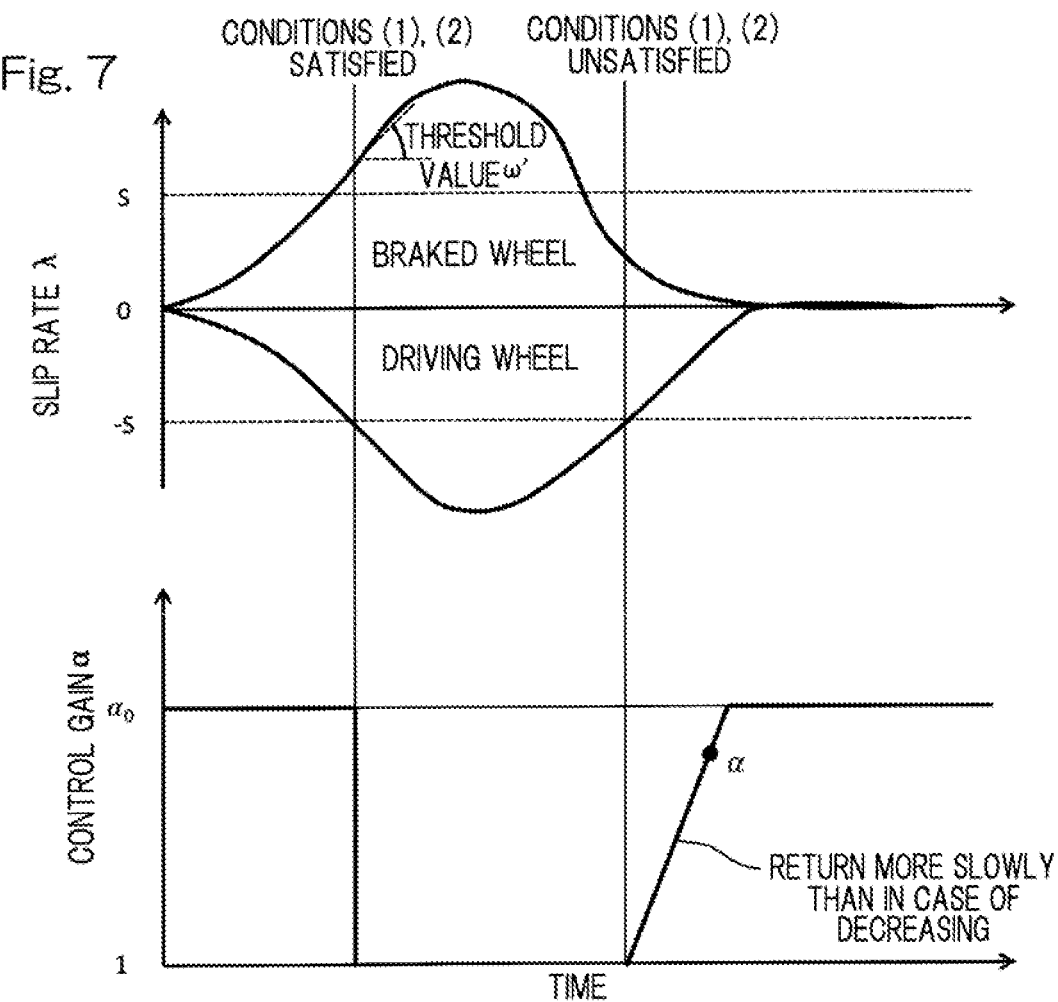
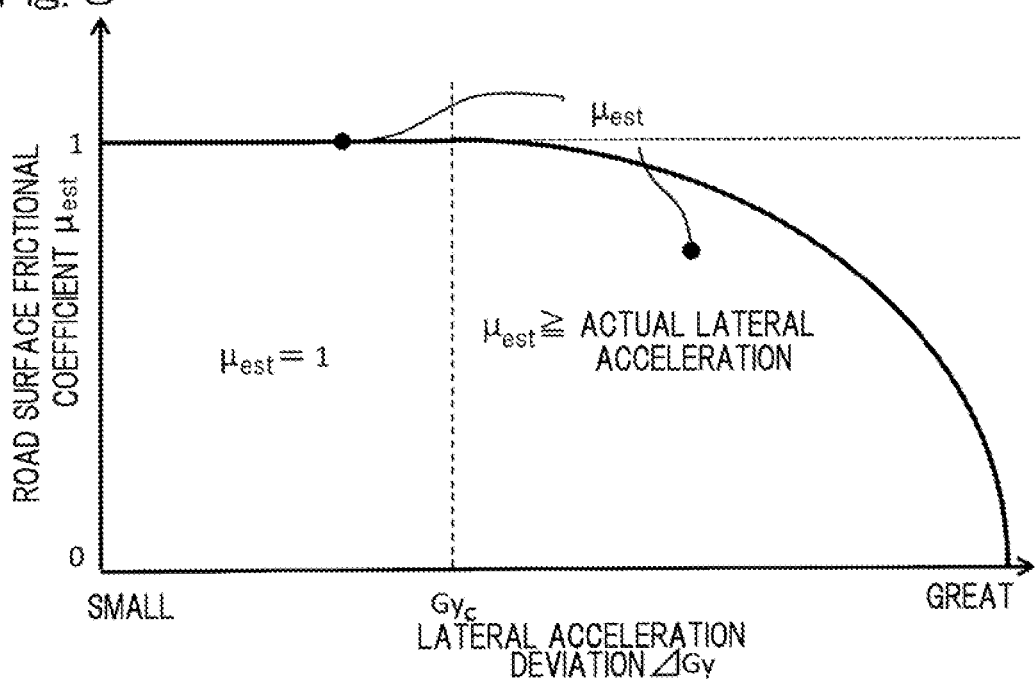

Fig. 13A  CASE OF FOUR-WHEEL DRIVE VEHICLE
(YAW MOMENT CONTROL BY FRICTION BRAKE)
→ DRIVING TORQUE (ENGINE OUTPUT)   ⇢ BRAKING TORQUE (FRICTION BRAKE)

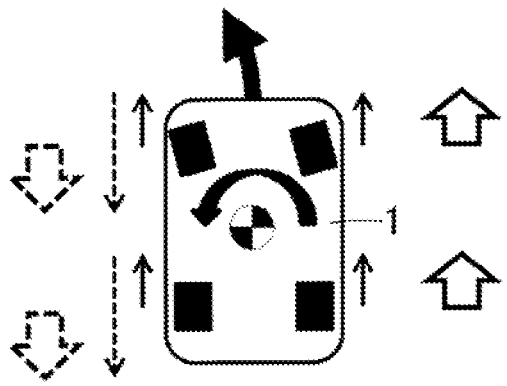

Fig. 13B  CASE OF FRONT-WHEEL DRIVE VEHICLE
(YAW MOMENT CONTROL BY FRICTION BRAKE)
→ DRIVING TORQUE (ENGINE OUTPUT)   ⇢ BRAKING TORQUE (FRICTION BRAKE)

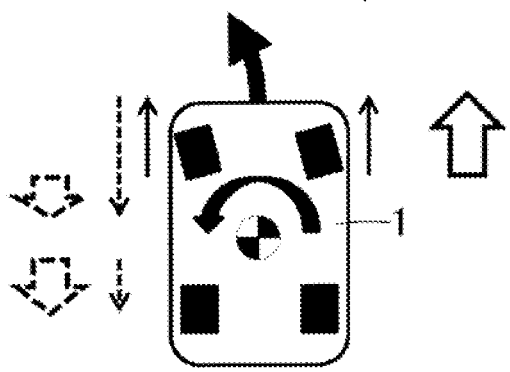

Fig. 13C  CASE OF REAR-WHEEL DRIVE VEHICLE
(YAW MOMENT CONTROL BY FRICTION BRAKE)
→ DRIVING TORQUE (ENGINE OUTPUT)   ⇢ BRAKING TORQUE (FRICTION BRAKE)

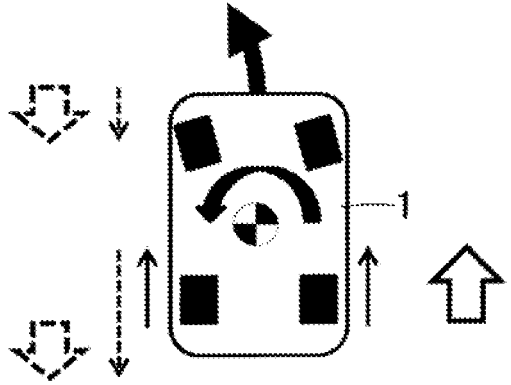

VEHICLE TURNING CONTROL APPARATUS

CROSS REFERENCE TO THE RELATED APPLICATIONS

This application is a National Phase Application, under 35 U.S.C. § 371, of International Application No. PCT/JP2017/038147, filed on Oct. 23, 2017, which is based on and claims Convention priority to Japanese patent application No. 2016-211425, filed Oct. 28, 2016, the entire disclosures of which are herein incorporated by reference as a part of this application.

BACKGROUND OF THE INVENTION

Field of the Invention

The present invention relates to a vehicle turning control apparatus or device which optimally controls turning performance of a vehicle by causing a target yaw rate to approach the original response characteristic of the vehicle in accordance with slip of a wheel before saturation of a tire force.

Description of Related Art

Conventionally, technology is proposed in which a road surface frictional coefficient is estimated using an acceleration sensor and the like mounted on a vehicle, and yaw angular acceleration model following control (yaw moment control) or ESC (vehicle attitude stabilization control) is controlled in accordance with the road surface frictional coefficient. For example, a control device is proposed which estimates a road surface frictional coefficient by an outside recognition unit mounted on a vehicle and optimally controls a target moment calculated from the vehicle speed and the steering angle of the vehicle, in accordance with the road surface frictional coefficient (Patent Document 1).

RELATED DOCUMENT

Patent Document

[Patent Document 1] JP Laid-open Patent Publication No. 2016-20168

In the method for estimating the road surface frictional coefficient in Patent Document 1, for example, in the case where the road surface frictional coefficient is estimated using an acceleration sensor or the like, it takes time until an acceleration occurs after turning is performed. Therefore, estimation for the road surface frictional coefficient is delayed, so that the vehicle might become unstable due to yaw moment control. In addition, in the case where a braking/driving force is applied by yaw moment control at a place with an extremely low road surface frictional coefficient, the slip rate and the wheel angular acceleration are increased, so that the tire force becomes more likely to be saturated. Therefore, it is necessary to figure out the road surface state earlier than the road surface frictional coefficient estimator does.

SUMMARY OF THE INVENTION

An object of the present invention is to provide a vehicle turning control device that enables immediate stabilization of the vehicle attitude before the tire force is saturated, i.e., before the tire grip limit is exceeded, and enables optimum control for the vehicle turning performance.

Hereinafter, the present invention will be described, using the reference characters in the embodiments for convenience sake in order to facilitate the understanding.

A vehicle turning control device according to the present invention is a vehicle turning control device controlling a turning characteristic of a vehicle having braking/driving sources 4 capable of independently controlling a braking/driving torque which is a braking torque or a driving torque for each of wheels 2, the vehicle turning control device including: a yaw moment control device 14 configured to control a yaw moment that occurs in the vehicle 1; and a slip determination device 34 configured to determine a road surface state from an angular velocity and an angular acceleration of the wheel 2 of the vehicle and a vehicle speed of the vehicle 1. The yaw moment control device 14 includes: a control gain calculator 26 configured to calculate a control gain; a target yaw rate calculator 25 configured to calculate a target yaw rate from the vehicle speed of the vehicle 1, a steering angle thereof, and the control gain calculated by the control gain calculator 26; and a yaw moment calculator 27 configured to calculate the braking/driving torque for each wheel 2 of the vehicle 1 in accordance with the target yaw rate calculated by the target yaw rate calculator 25. The control gain calculator 26 calculates the control gain in accordance with a predetermined condition on the basis of a determination result of the slip determination device 34.

The predetermined condition is optionally determined on the basis of designing or the like, and, for example, is determined by obtaining an appropriate condition through one or both of an experiment and a simulation.

In the above configuration, the slip determination device 34 determines the road surface state on the basis of the angular velocity and the angular acceleration of each wheel 2 and the vehicle speed. The control gain calculator 26 calculates the control gain in accordance with a predetermined condition on the basis of a result of determination by the slip determination device 34. The target yaw rate calculator 25 calculates the target yaw rate from the vehicle speed, the steering angle, and the control gain. The yaw moment calculator 27 calculates the braking/driving torque for each wheel 2 of the vehicle 1 in accordance with the target yaw rate. The torque command value Y is calculated from the above braking/driving torque, and each wheel 2 is controlled on the basis of the torque command value Y and the like.

The control gain calculator 26 calculates the control gain on the basis of the result of determination by the slip determination device 34 performed on the basis of the angular velocity and the angular acceleration of each wheel 2 and the vehicle speed. In this case, for example, as compared to a calculator that always calculates the control gain from the road surface frictional coefficient, etc., obtained in accordance with the lateral acceleration deviation, response delay in control can be eliminated. Therefore, it is possible to control the braking/driving torque without delay so as not to exceed the tire grip limit on a low-μ (frictional coefficient) road or the like, for example. Thus, the vehicle attitude can be immediately stabilized and turning performance of the vehicle 1 can be optimally controlled.

The yaw moment control device 14 may include a road surface frictional coefficient estimator 24 configured to estimate a road surface frictional coefficient; when the determination result of the slip determination device 34 satisfies a predetermined first condition, the control gain calculator 26 may calculate the control gain using the road surface frictional coefficient estimated by the road surface frictional coefficient estimator 24; and when the determination result of the slip determination device 34 satisfies a predetermined second condition different from the first condition, the control gain calculator 26 may return the control gain from a control gain which determines an initial yaw response characteristic to a control gain corresponding to an original or inherent yaw response characteristic of the vehicle.

Each of the predetermined first and second conditions is optionally determined on the basis of designing or the like, and, for example, is determined by obtaining an appropriate condition through one or both of an experiment and a simulation.

In the above configuration, when the first condition is satisfied, the control gain calculator 26 calculates the control gain using the road surface frictional coefficient. When the second condition is satisfied, the control gain calculator 26 returns the control gain from the control gain which determines the initial yaw response characteristic to the control gain corresponding to the original yaw response characteristic of the vehicle. Regarding the second condition, for example, when a condition in which the slip rate is great and the wheel angular acceleration is also great is satisfied, the control gain is set to the control gain corresponding to the original yaw response characteristic of the vehicle, whereby the vehicle attitude can be immediately stabilized.

The slip determination device 34 may calculate a slip rate of the wheel 2 from the angular velocity of the wheel 2 and the vehicle speed of the vehicle 1, and determines the road surface state in accordance with the angular acceleration and the slip rate of the wheel 2; the first condition may be that an absolute value of the slip rate is equal to or greater than a first threshold value and an absolute value of the angular acceleration is smaller than a second threshold value; and the second condition may be that the absolute value of the slip rate is equal to or greater than the first threshold value and the absolute value of the angular acceleration is equal to or greater than the second threshold value.

In the above configuration, for example, in the case where the road surface frictional coefficient is extremely small, the braking/driving torque in the yaw moment control is immediately set to zero, whereby the vehicle attitude can be immediately stabilized.

The road surface frictional coefficient estimator 24 may estimate the road surface frictional coefficient in accordance with the slip rate calculated by the slip determination device 34, a deviation between an actual lateral acceleration detected by a lateral acceleration detector 21 provided to the vehicle 1 and a target lateral acceleration, and a deviation between an actual yaw rate detected by a yaw rate detector 20 provided to the vehicle and the target yaw rate. Thus, it is possible to estimate the road surface frictional coefficient from the slip rate, the lateral acceleration deviation, and the yaw rate deviation.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 7 shows the relationship between a control gain and each of a slip rate and a wheel angular acceleration in the turning control device;

FIG. 8 shows the relationship between a lateral acceleration deviation and a road surface frictional coefficient in the turning control device;

FIG. 13A shows an example in a four-wheel drive type in which a yaw moment is generated in such a direction as to improve turning performance, when the vehicle turns left, according to another embodiment of the present invention;

FIG. 13B shows an example in a front-wheel drive type in which a yaw moment is generated in such a direction as to improve turning performance, when the vehicle turns left, according to another embodiment of the present invention; and FIG. 13C shows an example in a rear-wheel drive type in which a yaw moment is generated in such a direction as to improve turning performance, when the vehicle turns left, according to another embodiment of the present invention.

DESCRIPTION OF EMBODIMENTS

Figure 1:
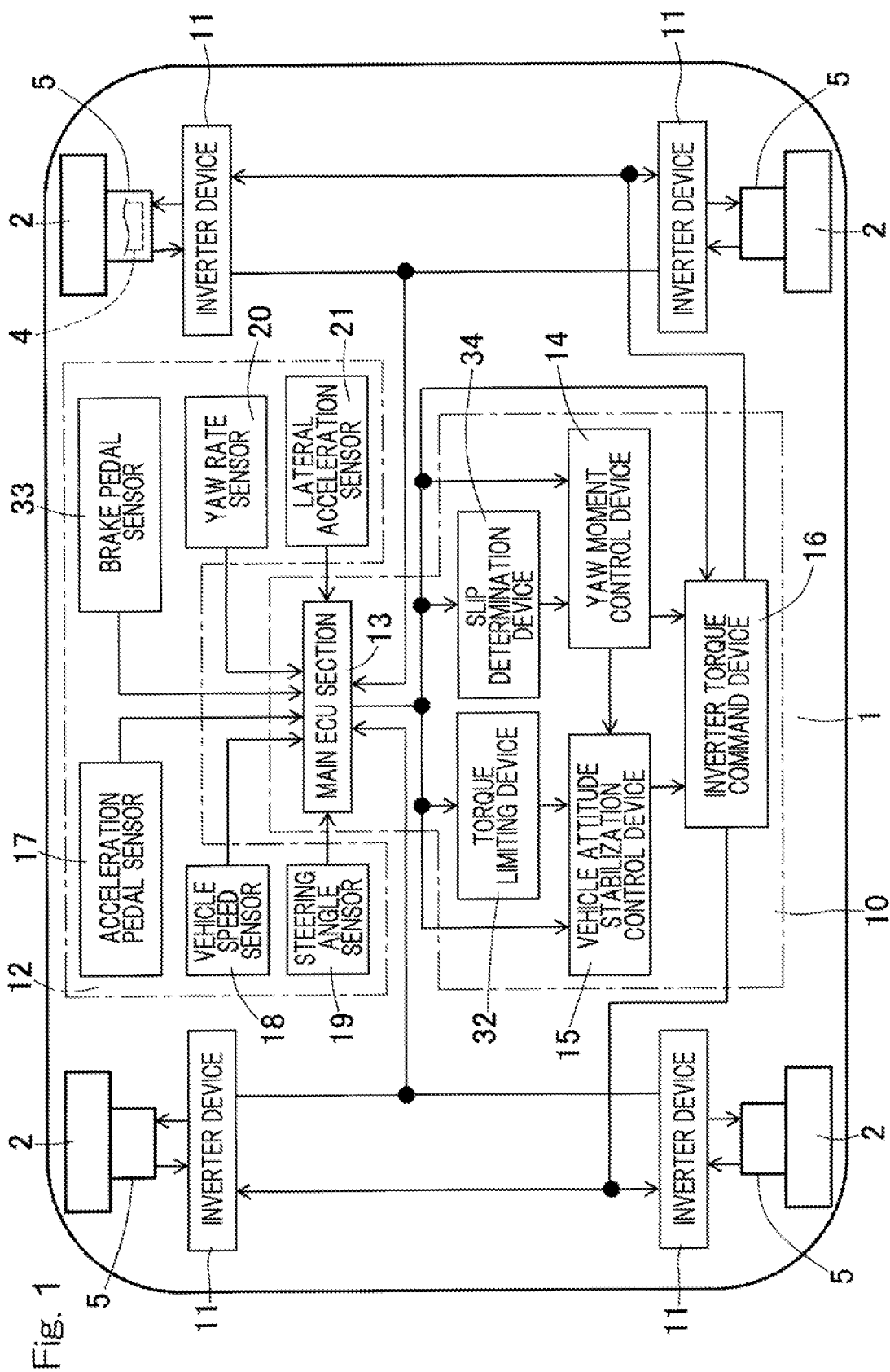
FIG. 1 is a system configuration diagram showing the conceptual configuration of a vehicle turning control device according to one embodiment of the present invention.

A vehicle turning control device according to one embodiment of the present invention will be described with reference to FIG. 1 to FIG. 12. As shown in FIG. 1, an example in which a vehicle 1 provided with the turning control device is of four-wheel independent driven type having in-wheel motor driving devices 5 for all the four wheels, will be described. In this vehicle 1, wheels 2 that are right and left rear wheels and wheels 2 that are right and left front wheels are independently driven by electric motors 4 each serving as a braking/driving source for generating a driving torque or a braking torque.

Figure 2:
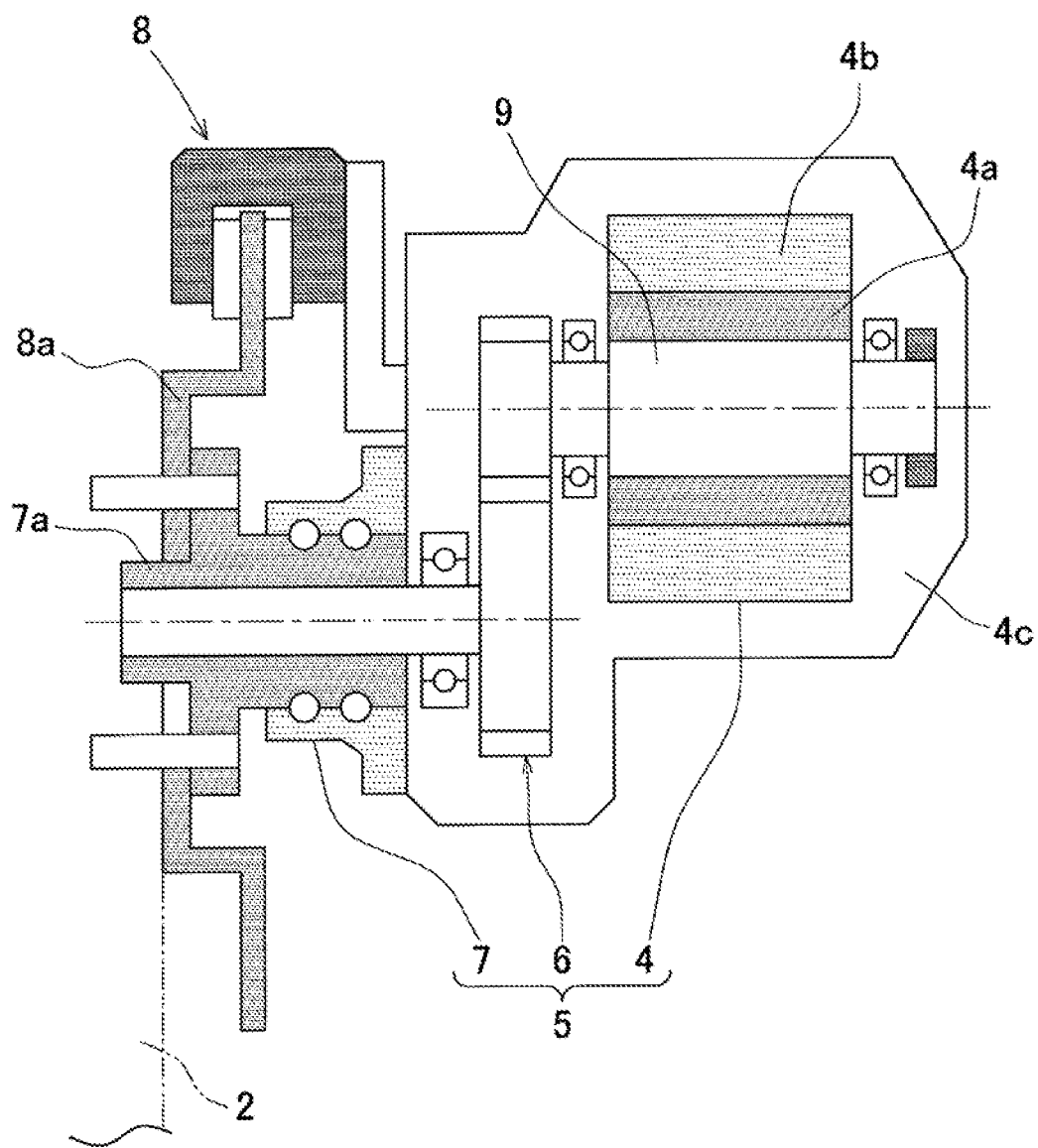
FIG. 2 is a sectional view showing an example of an in-wheel motor driving device of the vehicle.

As shown in FIG. 2, each in-wheel motor driving device 5 has the electric motor 4, a speed reducer or reduction gear 6, and a wheel bearing 7, and these are partially or entirely provided in the wheel 2. Rotation of the electric motor 4 is transmitted to the wheel 2 via the speed reducer 6 and the wheel bearing 7. The in-wheel motor driving device 5 generates a driving torque or a braking torque by switching of the rotation direction (driving direction) of the electric motor 4. A brake rotor 8a composing a frictional brake device 8 is fixed to a flange portion of a hub ring 7a of the wheel bearing 7, and the brake rotor 8a rotates integrally with the wheel 2. The electric motor 4 has at least a rotor 4a and a stator 4b, further has a housing 4c, and is, for example, an interior magnet synchronous motor having permanent magnets embedded in a core portion of the rotor 4a. The electric motor 4 is a motor in which a radial gap is provided between the stator 4b fixed to the housing 4c and the rotor 4a attached to a rotary output shaft 9.

In FIG. 1, a control system will be described. In this example, the vehicle turning control device includes: a driving control device 10 configured from an electric control unit (ECU); a plurality of (in this example, four) inverter devices 11 provided for the respective electric motors 4; and sensors 12. The driving control device 10 includes a main ECU section 13, a yaw moment control device 14, a vehicle attitude stabilization control device 15, a torque limiting device 32, a slip determination device 34, and an inverter torque command device 16.

The driving control device 10 is composed of a computer such as a microcomputer having a processor, a ROM (Read Only Memory) having a program to be executed by the processor, various electronic circuits such as a RAM (Random Access Memory) and a co-processor, and the like. The driving control device 10 and each inverter device 11 are connected via an in-vehicle communication network such as CAN (control area network).

The main ECU section 13 has, as a basic configuration thereof, a function for performing integrated control and cooperative control for the entire vehicle, and a braking/driving command generation function. This braking/driving command generation function is a function of generating a torque command value which is an accelerating/decelerating command value, to be given to each electric motor 4, from an acceleration command value and a brake command value. The acceleration command value is a command value of operation amount detected by an acceleration pedal sensor 17 provided to an acceleration pedal (not shown). The brake command value is a command value of operation amount detected by a brake pedal sensor 33 provided to a brake pedal (not shown). When the driver operates the acceleration pedal to command for driving, the acceleration command value is inputted from the acceleration pedal sensor 17 to the main ECU section 13 in accordance with the operation amount of the acceleration pedal.

An acceleration command value from the main ECU section 13 is sent to the inverter device 11 via the yaw moment control device 14 and the like. Each inverter device 11 converts DC power of a battery (not shown) to AC power for driving the corresponding electric motor 4, and has a control unit (not shown) for controlling the output thereof, thereby controlling the corresponding electric motor 4 in accordance with the torque command value distributed for each wheel 2. Each inverter device 11 includes a power circuit unit (not shown) which is a bridge circuit or the like including switching elements for converting the DC power to AC power, and the control unit (not shown) for controlling the power circuit unit.

The sensors 12 include the acceleration pedal sensor 17, the brake pedal sensor 33, a vehicle speed sensor 18 which is a vehicle speed detector, a steering angle sensor 19 which is a steering angle detector, a yaw rate sensor 20 which is a yaw rate detector, and a lateral acceleration sensor 21 which is a lateral acceleration detector. The steering angle sensor 19 is a sensor for detecting the steering angle of a steering wheel or the like (not shown). The steering angle from the steering angle sensor 19, the vehicle speed or traveling speed of the vehicle from the vehicle speed sensor 18, the actual lateral acceleration from the lateral acceleration sensor 21, and the actual yaw rate from the yaw rate sensor 20 are inputted to the main ECU section 13. These values are outputted from the main ECU section 13 to the torque limiting device 32, the slip determination device 34, the yaw moment control device 14, and the vehicle attitude stabilization control device 15.

Figure 3:
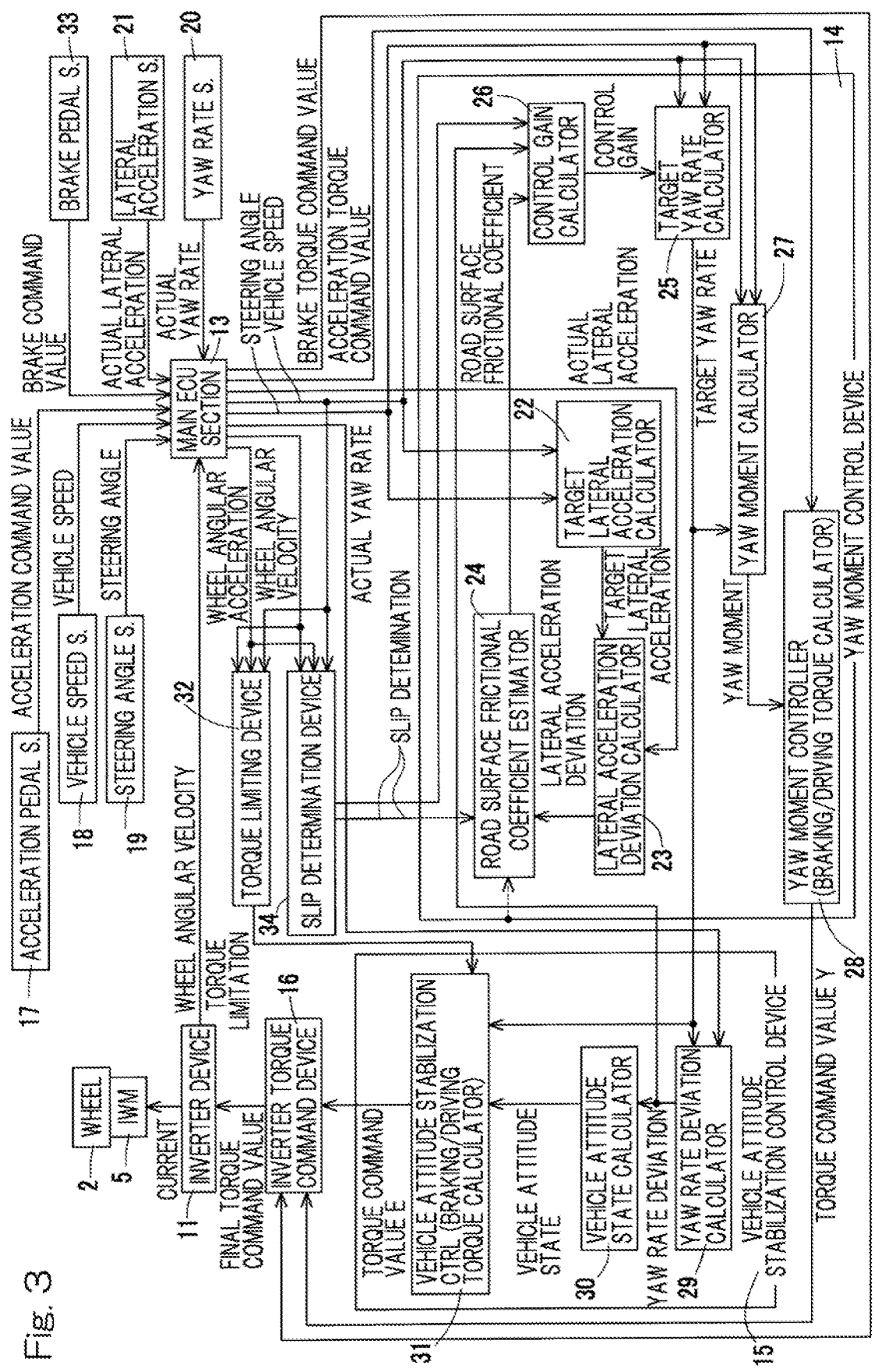
FIG. 3 is a block diagram showing a specific example of a part of the turning control device.

As shown in FIG. 3, the turning control device includes the torque limiting device 32 for limiting a torque, and the slip determination device 34 for performing determination as to wheel slip. The yaw moment control device 14 includes a target lateral acceleration calculator 22, a lateral acceleration deviation calculator 23, a road surface frictional coefficient estimator 24, a target yaw rate calculator 25, a control gain calculator 26, a yaw moment calculator 27, and a yaw moment controller (braking/driving torque calculator) 28. The vehicle attitude stabilization control device 15 includes a yaw rate deviation calculator 29, a vehicle attitude state calculator 30, and a vehicle attitude stabilization controller (braking/driving torque calculator) 31.

The vehicle speed, and the angular velocity and the angular acceleration of each wheel, are inputted from the main ECU section 13 to the torque limiting device 32. The torque limiting device 32 limits the braking/driving torque when the absolute values of slip rates for the right and left wheels calculated from the vehicle speed and the angular velocities of the wheels are equal to or greater than a first threshold value S and the greater one of the absolute values of the wheel angular accelerations of the right and the left wheels is equal to or greater than a second threshold value ω'. It is noted that the torque limiting device 32 may limit the braking/driving torque, when the absolute values of slip rates for the right and left wheels are greater than the first threshold value S and the greater one of the absolute values of the wheel angular accelerations of the right and left wheels is greater than the second threshold value ω'.

The torque limiting device 32 may determine whether to limit the braking/driving torque, on the basis of values correlated with the wheel angular accelerations, instead of the greater one of the absolute values of the wheel angular accelerations of the right and left wheels. The values correlated with the wheel angular accelerations are, for example, differential values of slip rates, differential values of the absolute values of slip rates, or the like. That is, as used herein, when a "wheel angular acceleration" is merely mentioned, the meaning thereof includes not only a "wheel angular acceleration" but also a "value correlated with a wheel angular acceleration".

The vehicle speed, and the angular velocity and the angular acceleration of each wheel, are inputted from the main ECU section 13 to the slip determination device 34. When the slip determination device 34 determines that the absolute values of slip rates for the right and left wheels calculated from the vehicle speed and the angular velocities of the wheels are equal to or greater than the first threshold value S and the greater one of the wheel angular accelerations of the right and left wheels is smaller than the second threshold value ω', the road surface frictional coefficient estimator 24 estimates the road surface frictional coefficient in accordance with the slip rates.

When the slip determination device 34 determines that the absolute values of slip rates for the right and left wheels calculated from the vehicle speed and the angular velocities of the wheels are equal to or greater than the first threshold value S and the greater one of the wheel angular accelerations of the right and left wheels is equal to or greater than the second threshold value ω', the control gain calculator 26 causes a control gain, which determines the response characteristic of the target yaw rate, to approach the original yaw response characteristic of the vehicle from the initial yaw response characteristic. It is noted that the slip determination device 34 may cause the control gain to approach the original yaw response characteristic of the vehicle from the initial yaw response characteristic, when the absolute values of slip rates for the right and left wheels are greater than the first threshold value S and the greater one of the wheel angular accelerations of the right and left wheels is greater than the second threshold value ω'.

Figure 4:
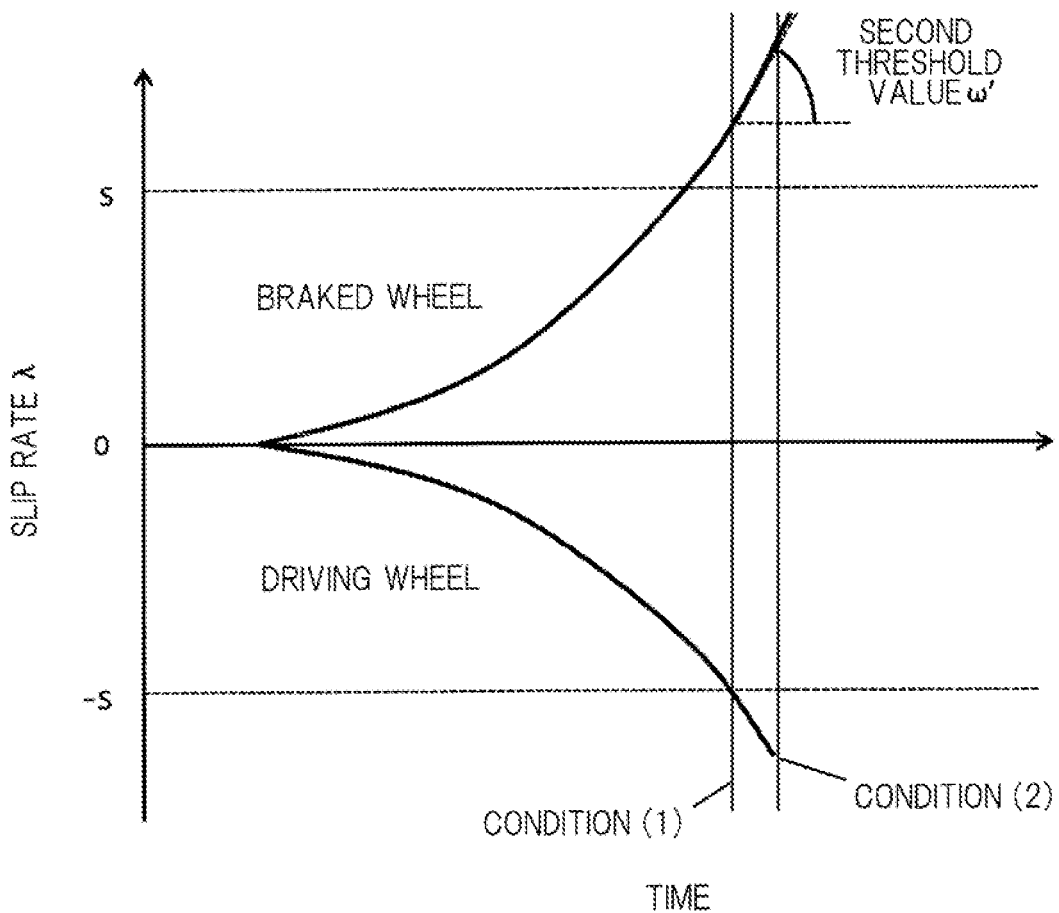
FIG. 4 shows conditions for limiting a braking/driving torque in the turning control device.

FIG. 4 shows conditions for limiting the braking/driving torque in the turning control device. FIG. 4 shows, as an example, the case where the slip rate of the braked wheel is equal to or greater than S or the slip rate of the driving wheel is equal to or smaller than —S (that is, the absolute values of the slip rates of the braked wheel and the driving wheel are equal to or greater than the first threshold value S) (condition (1)), and the absolute value of the angular acceleration of the braked wheel is equal to or greater than the second threshold value ω' (condition (2)). It is noted that, in the example shown in FIG. 4, for facilitating the understanding of the present invention, the case of limiting the braking/driving torque on the basis of the absolute values of the differential values of the slip rates, which are values correlated with the angular accelerations of the wheels, is shown.

Figure 5:
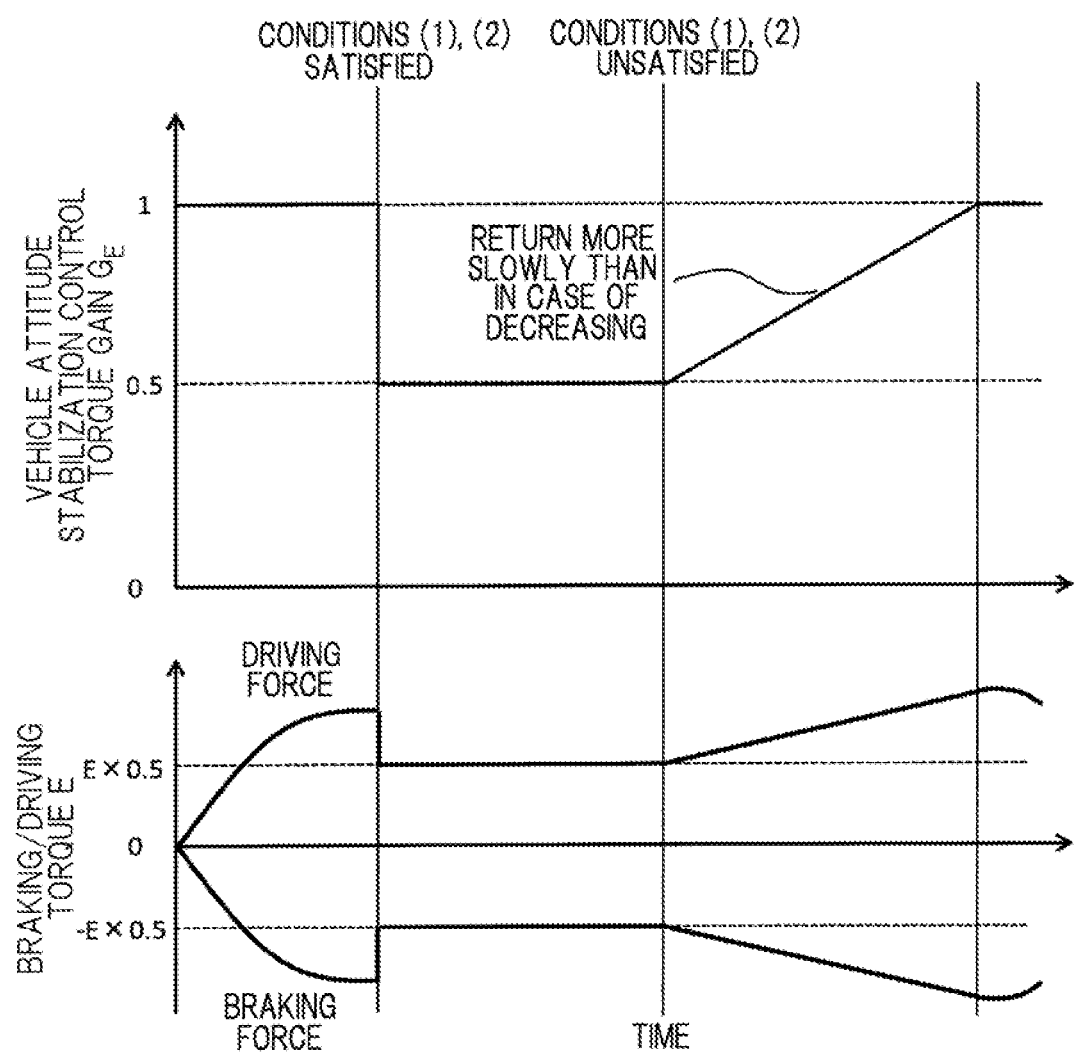
FIG. 5 shows transition of a gain for the braking/driving torque in a vehicle attitude stabilization controller of the turning control device.

As shown in FIG. 5, in the torque limiting device 32 (FIG. 3), if the condition (1) and the condition (2) are satisfied, a gain (torque gain) $G_E$ for a braking/driving torque E of the vehicle attitude stabilization controller 31 (FIG. 3) is halved, and using the driving force at that time as an upper limit value and using the braking force at that time as a lower limit value, the braking/driving torque E is limited. As an example, FIG. 5 shows a state when the gain $G_E$ is halved from the original gain or original value. It is noted that, in this vehicle attitude stabilization control, when the conditions (1), (2) are unsatisfied and the torque gain $G_E$ is returned (increased) to its original value, the torque gain rises with a smaller change amount per time than when decreased.

Figure 6:
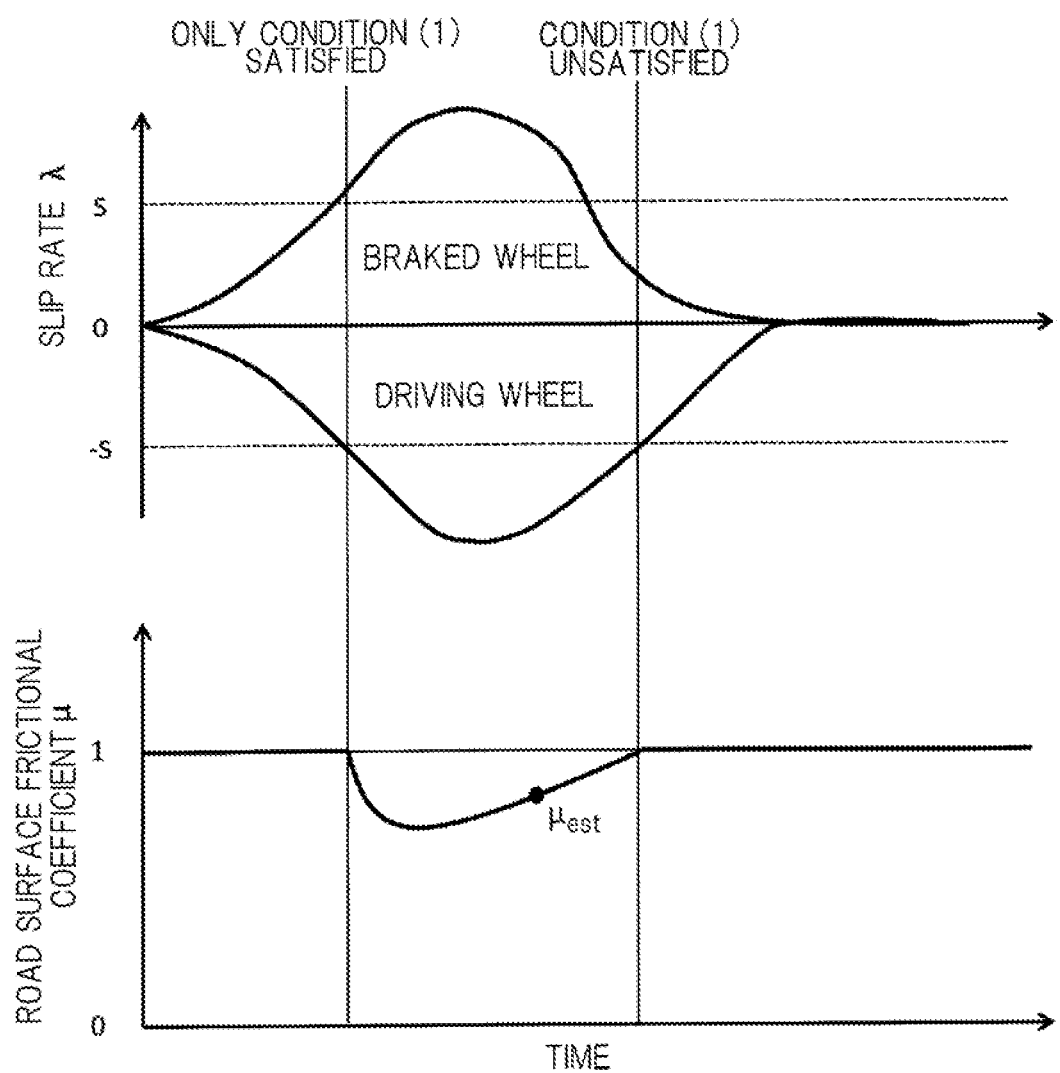
FIG. 6 shows the relationship between a slip rate and a road surface frictional coefficient in the turning control device.

As shown in FIG. 6, in the case where only the condition (1) is satisfied in the slip determination device 34 (FIG. 3), the road surface frictional coefficient estimator 24 estimates the road surface frictional coefficient in accordance with the slip rates at that time. As shown in FIG. 7, in the case where the condition (1) and the condition (2) are satisfied in the slip determination device 34 (FIG. 3), the control gain calculator 26 (FIG. 3) sets the control gain to "1", which control gain determines the response characteristic of the target yaw rate, in order to cause the response characteristic of the target yaw rate to approach the original yaw response characteristic of the vehicle from the initial yaw response characteristic. In this example shown in FIG. 7, when the conditions (1), (2) are unsatisfied and the control gain α is returned (increased) to its original value, the control gain α rises with a smaller change amount per time than when the control gain α is decreased.

Here, a formula for calculating a slip rate is shown in Expression (1). In Expression (1), λ, is a slip rate, u is a vehicle speed, and $R_0$ is a tire effective radius, and ω is a wheel angular velocity. In addition, Expression (2) represents a torque limitation condition in the torque limiting device 32 (FIG. 3), Expression (3) represents an estimation condition of road surface frictional coefficient in the slip determination device 34 (FIG. 3), and Expression (4) represents a limitation condition of control gain in the slip determination device 34 (FIG. 3).

[Mathematical 1]

$$\lambda = \frac{(u - R_0\omega)}{\max(u, R_0\omega)} \qquad \text{Expression (1)}$$

<Torque Limiting Device>

Condition (1): |Slip rates of right and left wheels|≥ first threshold value S

Condition (2): |Wheel angular acceleration of one of right and left wheels|≥ second threshold value ω'

If the condition (1) is satisfied and the condition (2) is satisfied, the following expression is used.

$$\text{Braking/driving torque } E \text{ in vehicle attitude stabilization control} = E \times 0.5 \qquad \text{Expression (2)}$$

<Slip Determination Device (for Limitation for Road Surface Frictional Coefficient)>

Condition (1): |Slip rates of right and left wheels|≥ first threshold value S

Condition (2): |Wheel angular acceleration of one of right and left wheels|≤ second threshold value ω'

If only the condition (1) is satisfied, the road surface frictional coefficient is estimated (Expression (3))

<Slip Determination Device (for Limitation for Control Gain)>

Condition (1): Slip rates of right and left wheels|≥ first threshold value S

Condition (2): |Wheel angular acceleration of one of right and left wheels|≥ second threshold value ω'

If the condition (1) is satisfied and the condition (2) is satisfied, the following expression is used.

$$\text{Control gain} = 1 \qquad \text{Expression (4)}$$

<Yaw Moment Control Device>

As shown in FIG. 3, a vehicle speed, a steering angle, an actual lateral acceleration, an acceleration torque command value from the acceleration pedal sensor 17, and a brake torque command value from the brake pedal sensor 33 are inputted from the main ECU section 13 to the yaw moment control device 14. In the yaw moment control device 14, the target lateral acceleration calculator 22 calculates a target lateral acceleration from the vehicle speed, the steering angle, and vehicle parameters such as vehicle mass and wheelbase. The lateral acceleration deviation calculator 23 calculates a lateral acceleration deviation, from a difference between the target lateral acceleration calculated by the target lateral acceleration calculator 22 and the actual lateral acceleration inputted from the main ECU section 13.

The road surface frictional coefficient estimator 24 calculates a road surface frictional coefficient in accordance with Expressions (5) and (6) shown below. FIG. 8 shows the relationship between the lateral acceleration deviation and the road surface frictional coefficient in the turning control device. As shown in FIG. 3 and FIG. 8, if the lateral acceleration deviation outputted from the lateral acceleration deviation calculator 23 is equal to or smaller than a threshold value $Gy_c$, the road surface frictional coefficient estimator 24 sets a road surface frictional coefficient $\mu_{est}$ to "1", and if the lateral acceleration deviation is greater than the threshold value $Gy_c$, the road surface frictional coefficient estimator 24 calculates the road surface frictional coefficient $\mu_{est}$ from an actual lateral acceleration $Gy_{act}$. Where the target lateral acceleration is $Gy_{ref}$, the actual lateral acceleration is $Gy_{act}$, and the road surface frictional coefficient is $\mu_{est}$, the road surface frictional coefficient is estimated as follows.

If $|Gy_{ref}|-|Gy_{act}| \le Gy_c$, then $\mu_{est}=1$  Expression (5)

If $|Gy_{ref}|-|Gy_{act}| \le Gy_c$, then $\mu_{est} \ge |Gy_{act}|$  Expression (6)

As shown in FIG. 3, the target yaw rate calculator 25 calculates a plurality of target yaw rates, using the vehicle speed, the steering angle, and the control gain. Specifically, the target yaw rate calculator 25 outputs a plurality of values calculated using a transfer function of a second-order lag system of a target yaw rate r(s) relative to an actual steering angle δ(s), shown in Expression (7), for example.

[Mathematical 2]

$$\frac{r(s)}{\delta(s)} = G_\delta^r(0) \frac{(\alpha\omega_n)^2(1+T_r s)}{(\alpha\omega_n)^2 + 2\left(\frac{1}{\lambda}\zeta\right)(\alpha\omega_n)s + s^2}$$  Expression (7)

Expression (7) is constituted of $G_\delta^r(0)$ which is a yaw angular velocity gain constant, $\omega_n$ which is a natural frequency in the yaw direction, $\zeta$ which is an attenuation coefficient in the yaw direction, $T_r$ which is a yaw angular velocity time constant, s which is the Laplace operator, a which is a control gain of the natural frequency $\omega_n$, and λ which is a control gain of the attenuation coefficient $\zeta$, and these values are calculated from the vehicle speed and vehicle parameters such as vehicle mass and wheelbase. If the control gain α of the natural frequency $\omega_n$ or the control gain λ of the attenuation coefficient $\zeta$ is greater than "1", rising of the target yaw rate becomes faster, and if the control gain α and λ is "1", the original yaw response characteristic of the vehicle is obtained.

The control gain calculator 26 calculates the respective control gains α, λ, to be used in the target yaw rate calculator 25, in accordance with the road surface frictional coefficient calculated by the road surface frictional coefficient estimator 24 and a yaw rate deviation calculated by a yaw rate deviation calculator 29 described later. The control gain α of the natural frequency $\omega_n$ and the control gain λ of the attenuation coefficient have substantially the same characteristic. Therefore, regarding the control gain mentioned hereafter, description will be given using the control gain α of the natural frequency $\omega_n$ as an example, while description for the control gain λ of the attenuation coefficient $\zeta$ is omitted.

Figure 9:
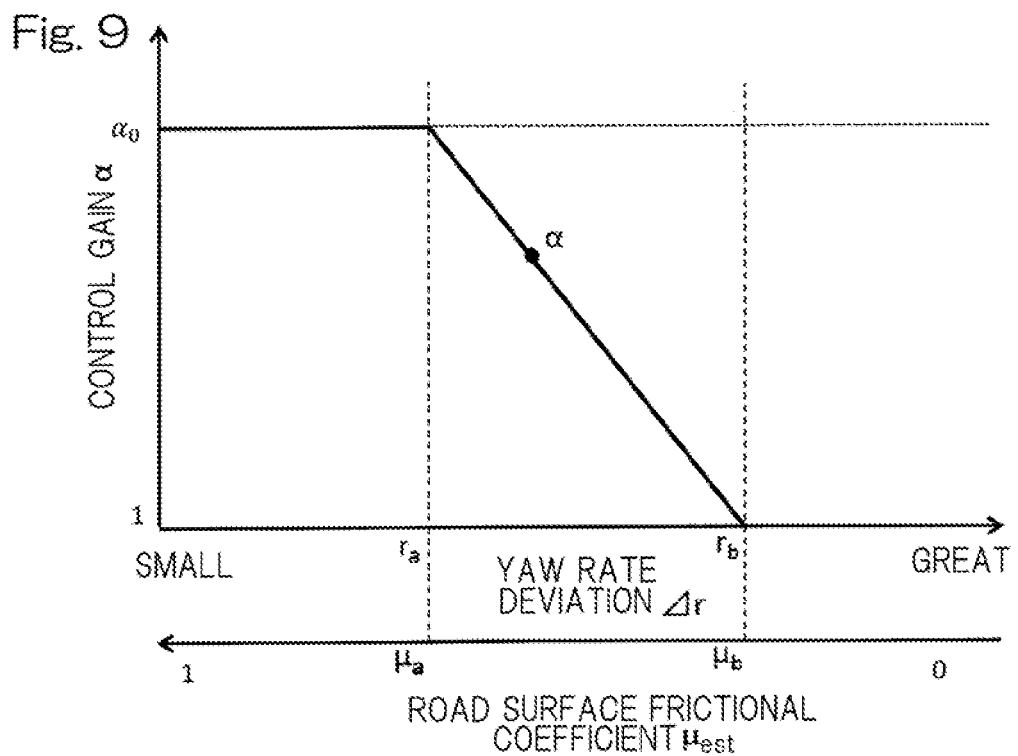
FIG. 9 shows the relationship between a control gain and each of a yaw rate deviation and a road surface frictional coefficient in the turning control device.

Here, as shown in FIG. 9, two threshold values may be provided for the road surface frictional coefficient or the yaw rate deviation, respectively, to determine the control gain α. For example, if the road surface frictional coefficient is equal to or greater than a first threshold value $\mu_a$ or the yaw rate deviation is equal to or smaller than a first threshold value $r_a$, the control gain α is set to an initial value (predetermined yaw response characteristic) $\alpha_0$. If the road surface frictional coefficient is smaller than the threshold value $\mu_a$ or the yaw rate deviation is greater than the threshold value $r_a$, the control gain α is caused to approach "1" from the initial value $\alpha_0$. Further, if the road surface frictional coefficient is smaller than a threshold value $\mu_b$ or the yaw rate deviation is greater than a threshold value $r_b$, the control gain α is set to "1".

Figure 10:
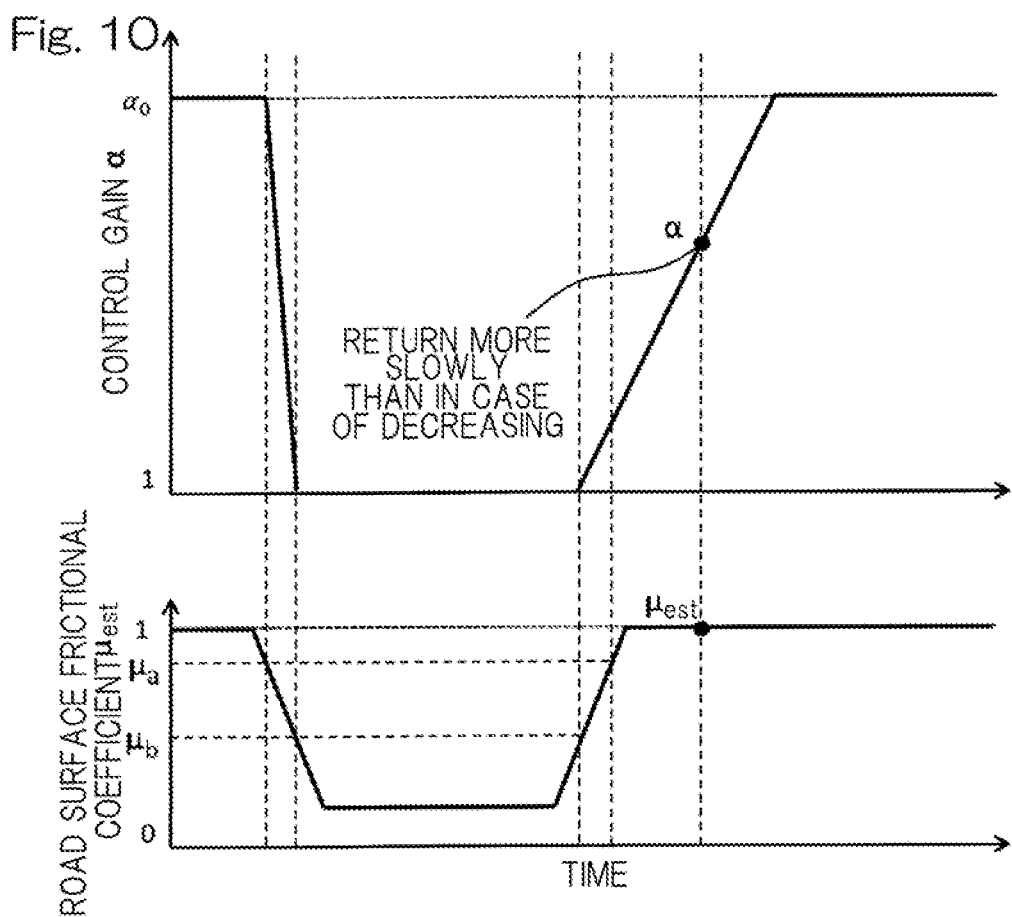
FIG. 10 shows an example of transition of the control gain in the turning control device.

In the control gain calculator 26 shown in FIG. 3, when the control gain is changed from the original yaw response characteristic of the vehicle to the initial value, the amount of change in the control gain per time is set to be smaller than when the control gain is changed from the initial value to the original yaw response characteristic of the vehicle. Specifically, as shown in FIG. 10, as compared to the case where the control gain α decreases from the initial value $\alpha_0$ to "1" which is the original yaw response characteristic of the vehicle, the amount of change per time, when the control gain α returns from "1" to the initial value $\alpha_0$, is smaller.

At a place with a low road surface frictional coefficient, the tire grip force is likely to be lost, and therefore, the control gain calculator 26 (FIG. 3) immediately decreases the control gain α, to decrease the braking/driving torque in the yaw moment control. Thereafter, if the vehicle starts to travel on a road surface having a high road surface frictional coefficient, the tire grip force is restored, and therefore the control gain calculator 26 gradually returns the control gain α to the initial value $\alpha_0$, to increase the braking/driving torque in the yaw moment control. Thus, uncomfortable feeling is not given to the driver.

As shown in FIG. 3, the yaw moment calculator 27 calculates a braking/driving torque which is a braking torque or a driving torque for each wheel 2 in accordance with the target yaw rate calculated by the target yaw rate calculator 25, thereby calculating a yaw moment that is to occur in the vehicle. The yaw moment calculator 27 calculates a plurality of yaw moments. For example, the yaw moment calculator 27 outputs a plurality of values calculated using a transfer function of a third-order lag system of a yaw moment $M_z(s)$ relative to the actual steering angle δ(s), shown in Expression (8).

[Mathematical 3]

$$\frac{M_z(s)}{\delta(s)} = \frac{G_\delta^r(0)\dfrac{(\alpha\omega_n)^2(1+T_r s)}{(\alpha\omega_n)^2 + 2\left(\frac{1}{\lambda}\zeta\right)(\alpha\omega_n)s + s^2} - G_\delta^r(0)\dfrac{\omega_n^s(1+T_r s)}{\omega_n^2 + 2\zeta\omega_n s + s^2}}{G_M^r(0)\dfrac{\omega_n^2(1+T_M s)}{\omega_n^2 + 2\zeta\omega_n s + s^2}}$$  Expression (8)

As in Expression (7), Expression (8) is constituted of $G_\delta^r(0)$ which is a yaw angular velocity gain constant, $\omega_n$ which is a natural frequency in the yaw direction, $\zeta$ which is an attenuation coefficient in the yaw direction, $T_r$ which is a yaw angular velocity time constant, $G_M^r(0)$ which is a yaw moment gain constant, $T_M$ which is a yaw moment time constant, s which is the Laplace operator, α which is a control gain of the natural frequency $\omega_n$, and λ which is a control gain of the attenuation coefficient $\zeta$ and these values are calculated from the vehicle speed and vehicle parameters such as vehicle mass and wheelbase.

From expression (8), it is found that, if the control gains α and λ are "1", the numerator is zero and thus the yaw moment $M_z(s)$ relative to the actual steering angle δ(s) is zero. In accordance with the acceleration torque command value inputted from the main ECU section 13 and the yaw moment calculated by Expression (8), the yaw moment controller (braking/driving torque calculator) 28 determines the braking/driving torques for the four wheels (or two wheels), and issues a torque command value Y to the inverter torque command device 16. If vehicle attitude stabilization control is not performed, the torque command value Y is used as a final command torque. In the following description, the torque command value Y may be referred to as braking/driving torque Y.

Figure 11:
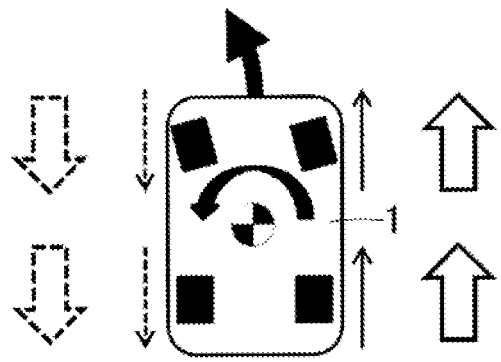
FIG. 11 shows an example in which a yaw moment is generated in such a direction as to improve turning performance, when the vehicle turns left.

FIG. 11 shows an example in which a yaw moment is generated in such a direction as to improve turning performance, when the vehicle 1 turns left. In FIG. 11, a solid-line thin arrow indicates a driving torque by the driving source. A broken-line thin arrow indicates a braking torque by the driving source (the same applies to FIGS. 13A to 13C). A thick filled arrow indicates a total value of a braking torque and a driving torque, a thick solid-line hollow arrow indicates a total value of driving torques, and a thick broken-line hollow arrow indicates a total value of braking torques (the same applies to FIGS. 13A to 13C).

In the vehicle shown in FIG. 11, a yaw moment is generated by output of a driving torque from the turning outer wheels and output of a braking torque from the turning inner wheels. If the driver performs an accelerating operation or a braking operation during turning of the vehicle 1, a driving torque or a braking torque is applied and therefore the vehicle 1 is accelerated or decelerated.

<Vehicle Attitude Stabilization Control Device 15>

The vehicle attitude stabilization control device 15 performs control for stabilizing the attitude of the vehicle. As shown in FIG. 3, the actual yaw rate is inputted from the main ECU section 13 to the vehicle attitude stabilization control device 15. The vehicle attitude stabilization control device 15 includes a yaw rate deviation calculator 29, a vehicle attitude state calculator 30, and a vehicle attitude stabilization controller (braking/driving torque calculator) 31. The yaw rate deviation calculator 29 calculates a yaw rate deviation, from a difference between the actual yaw rate and the target yaw rate calculated by the target yaw rate calculator 25.

Figure 12:
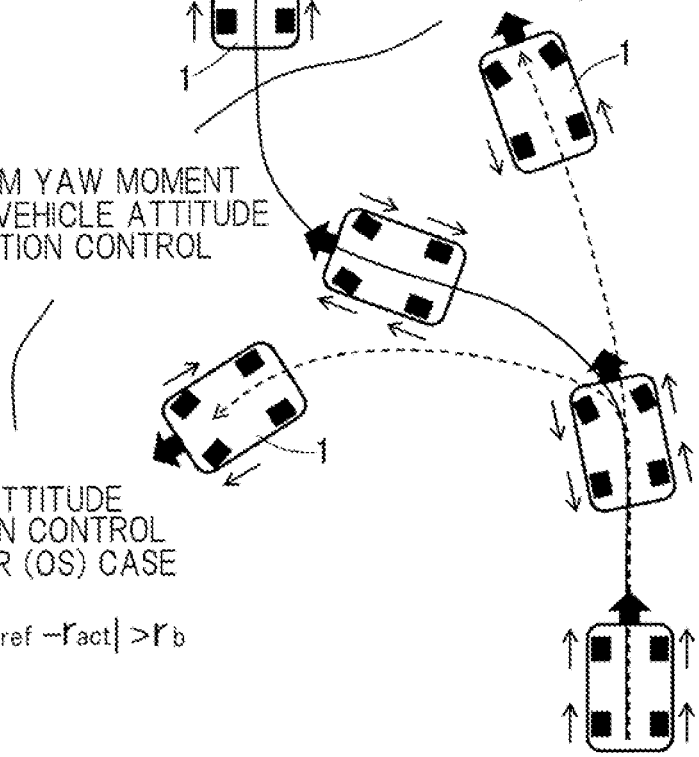
FIG. 12 shows three states of the attitude of the vehicle.

The vehicle attitude state calculator 30 calculates the attitude state of the vehicle from the magnitude of the yaw rate deviation calculated by the yaw rate deviation calculator 29. FIG. 12 shows three states of the attitude of the vehicle 1. In the case where the target yaw rate and the actual yaw rate are substantially equal, the above yaw moment control device 14 (FIG. 3) performs the yaw moment control to command braking torques or driving torques in the same direction for the front and rear wheels on one side as shown in FIG. 12, thereby generating a yaw moment.

On the other hand, at a place with a low road surface frictional coefficient, or the like, it is likely that the vehicle fails to take a curve, or spins. Where the target yaw rate is $r_{ref}$, the actual yaw rate is $r_{act}$, and the threshold value is $r_b$, the vehicle attitude state calculator 30 (FIG. 3) determines that the vehicle is in an understeer (US) state if Expression (9) is satisfied. The vehicle attitude state calculator 30 (FIG. 3) determines that the vehicle is in an oversteer (OS) state if Expression (10) is satisfied.

Understeer state, if $r_{ref} > r_{act}$ and $|r_{ref} - r_{act}| > r_b$     Expression (9)

Oversteer state, if $r_{ref} < r_{act}$ and $|r_{ref} - r_{act}| > r_b$     Expression (10)

A yaw moment is generated using the rear wheels as control wheels in the case of understeer state or using the front wheels as control wheels in the case of oversteer state, whereby the attitude of the vehicle 1 is stabilized.

As shown in FIG. 3, the vehicle attitude stabilization controller (braking/driving torque calculator) 31 of the vehicle attitude stabilization control device 15 calculates a braking/driving torque to be commanded, on the basis of the road surface frictional coefficient calculated by the road surface frictional coefficient estimator 24, the vehicle attitude state calculated by the vehicle attitude state calculator 30, and the target yaw rate calculated by the target yaw rate calculator 25, and issues the calculated value as a torque command value E. In the following description, the torque command value E may be referred to as braking/driving torque E.

The torque command value Y and the torque command value E are inputted to the inverter torque command device 16 which calculates the final torque command value. The inverter torque command device 16 issues the final torque command value calculated from the torque command value Y and the torque command value E, to each inverter device 11. The inverter device 11 controls current so that the output torque of the motor 4 corresponds to the final torque command value, thereby driving the in-wheel motor driving device 5.

The sections in the yaw moment control device 14 and the vehicle attitude stabilization control device 15 composing the driving control device 10 and the sections (not shown) in the inverter torque command device 16, the slip determination device 34, and the torque limiting device 32, are each configured specifically by a hardware circuit or a software function on a processor (not shown) that is capable of outputting results through calculation, using a look up table (LUT) realized by software or hardware, a predetermined conversion function stored in a library of software, hardware equivalent thereto, or the like, and as necessary, a comparison function or an arithmetic operation function in the library, hardware equivalent thereto, or the like.

<Operations and Effects>

In the vehicle turning control device described above, the slip determination device 34 determines the road surface state on the basis of the angular velocity and the angular acceleration of each wheel and the vehicle speed. The control gain calculator 26 calculates the control gain in accordance with a predetermined condition on the basis of a result of determination by the slip determination device 34. The target yaw rate calculator 25 calculates the target yaw rate from the vehicle speed, the steering angle, and the control gain. The yaw moment calculator 27 calculates the braking/driving torque for each wheel of the vehicle in accordance with the target yaw rate. The torque command value Y is calculated from the above braking/driving torque, and each wheel is controlled on the basis of the torque command value Y and the like.

The control gain calculator 26 calculates the control gain on the basis of the result of determination by the slip determination device 34 performed on the basis of the angular velocity and the angular acceleration of each wheel and the vehicle speed. In this case, for example, as compared to a calculator that always calculates the control gain from the road surface frictional coefficient, etc., obtained in accordance with the lateral acceleration deviation, response delay in control can be eliminated. Therefore, it is possible to control the braking/driving torque without delay so as not to exceed the tire grip limit on a low-p, road or the like, for example. Thus, the vehicle attitude can be immediately stabilized and the vehicle turning performance can be optimally controlled.

When the first condition is satisfied in which the absolute value of the slip rate is equal to or greater than the first threshold value and the absolute value of the wheel angular acceleration is smaller than the second threshold value, the control gain calculator 26 calculates the control gain using the road surface frictional coefficient. When the second condition is satisfied in which the absolute value of the slip rate is equal to or greater than the first threshold value and the absolute value of the wheel angular acceleration is equal to or greater than the second threshold value, the control gain calculator 26 returns the control gain from the control gain which determines the initial yaw response characteristic to the control gain corresponding to the original yaw response characteristic of the vehicle. Regarding the second condition, for example, when a condition in which the slip rate is great and the wheel angular acceleration is also great is satisfied, the control gain is set to the control gain corresponding to the original yaw response characteristic of the vehicle, whereby the vehicle attitude can be immediately stabilized.

OTHER EMBODIMENTS

As shown in FIG. 3, the road surface frictional coefficient estimator 24 may estimate the road surface frictional coefficient in accordance with the slip rate calculated by the slip determination device 34, a deviation between the actual lateral acceleration detected by the lateral acceleration sensor 21 and the target lateral acceleration, and a deviation between the actual yaw rate detected by the yaw rate sensor 20 and the target yaw rate. Thus, it is possible to estimate the road surface frictional coefficient from the slip rate, the lateral acceleration deviation, and the yaw rate deviation.

As the vehicle, other than a vehicle having the in-wheel motor driving devices for all the four wheels as described above, a vehicle using a friction brake for a braking torque may be applied. It is possible to perform yaw moment control using a friction brake, in the case of a four-wheel drive vehicle using an internal combustion engine as a driving source as shown in FIG. 13A, the case of a front-wheel drive vehicle having the same driving source as shown in FIG. 13B, and the case of a rear-wheel drive vehicle having the same driving source as shown in FIG. 13C. In each vehicle 1 shown in FIGS. 13A to 13C, driving torques by engine output are outputted from the turning outer wheels, and braking torques greater than the driving torques are outputted from the turning inner wheels by the friction brake, whereby a yaw moment is generated. It is noted that the meanings of arrows in FIGS. 13A to 13C are as described above.

In the in-wheel motor driving device, a cycloidal speed reducer, a planetary reducer, a speed reducer with two parallel shafts, or another speed reducer can be applied, or the in-wheel motor driving device may be a so-called direct motor type in which a speed reducer is not used. As the vehicle, the following vehicle may be applied: outputs of two motors provided in the vehicle body corresponding to the right and left wheels, respectively, are transmitted to the respective wheels via a drive shaft and the like and a braking/driving torque for each wheel is controlled independently.

Although the present invention has been fully described in connection with the preferred embodiments thereof with reference to the accompanying drawings, various additions, modifications, and/or deletions may be done without deviating from the scope of the present invention. Accordingly, such modifications and the like are to be construed as included in the scope of the present invention.

REFERENCE NUMERALS

1 . . . vehicle
2 . . . wheel
4 . . . electric motor (braking/driving source)
14 . . . yaw moment control device
20 . . . yaw rate sensor (yaw rate detector)
21 . . . lateral acceleration sensor (lateral acceleration detector)
24 . . . road surface frictional coefficient estimator
25 . . . target yaw rate calculator
26 . . . control gain calculator
27 . . . yaw moment calculator
34 . . . slip determination device

What is claimed is:

1. A vehicle turning control device controlling a turning characteristic of a vehicle having braking/driving sources capable of independently controlling a braking/driving torque which is a braking torque or a driving torque for each of wheels, the vehicle turning control device comprising:
 a yaw moment control device configured to control a yaw moment that occurs in the vehicle; and
 a slip determination device configured to determine a road surface state from an angular velocity and an angular acceleration of the wheel of the vehicle and a vehicle speed,
 wherein
 the yaw moment control device includes
  a control gain calculator configured to calculate a control gain,
  a target yaw rate calculator configured to calculate a target yaw rate from the vehicle speed, a steering angle thereof, and the control gain calculated by the control gain calculator, and
  a yaw moment calculator configured to calculate the braking/driving torque for each wheel of the vehicle in accordance with the target yaw rate calculated by the target yaw rate calculator, and
 the control gain calculator calculates the control gain in accordance with a predetermined condition on the basis of a determination result of the slip determination device.

2. The vehicle turning control device as claimed in claim 1, wherein
 the yaw moment control device includes a road surface frictional coefficient estimator configured to estimate a road surface frictional coefficient, and
 when the determination result of the slip determination device satisfies a predetermined first condition, the control gain calculator calculates the control gain using the road surface frictional coefficient estimated by the road surface frictional coefficient estimator, and when the determination result of the slip determination device satisfies a predetermined second condition different from the first condition, the control gain calculator returns the control gain from a control gain which determines an initial yaw response characteristic to a control gain corresponding to an original yaw response characteristic of the vehicle.

3. The vehicle turning control device as claimed in claim 2, wherein
 the slip determination device calculates a slip rate of the wheel from the angular velocity of the wheel and the vehicle speed, and determines the road surface state in accordance with the angular acceleration and the slip rate of the wheel, the first condition is that an absolute value of the slip rate is equal to or greater than a first threshold value and an absolute value of the angular acceleration is smaller than a second threshold value, and the second condition is that the absolute value of the slip rate is equal to or greater than the first threshold value and the absolute value of the angular acceleration is equal to or greater than the second threshold value.

4. The vehicle turning control device as claimed in claim 3, wherein the road surface frictional coefficient estimator estimates the road surface frictional coefficient in accordance with the slip rate calculated by the slip determination device, a deviation between an actual lateral acceleration detected by a lateral acceleration detector provided to the vehicle and a target lateral acceleration, and a deviation between an actual yaw rate detected by a yaw rate detector provided to the vehicle and the target yaw rate.

5. A vehicle turning control device for controlling a turning characteristic of a vehicle having braking/driving sources capable of independently controlling a braking/driving torque which is a braking torque or a driving torque for each of wheels, the vehicle turning control device comprising:

a memory configured to store instructions; and a processor configured to execute each of the instructions to:

control a yaw moment that occurs in the vehicle, determine a road surface state from an angular velocity and an angular acceleration of the wheel of the vehicle and a vehicle speed, calculate a control gain, calculate a target yaw rate from the vehicle speed, a steering angle thereof, and the control gain, calculate the braking/driving torque for each wheel of the vehicle in accordance with the target yaw rate, and calculate the control gain in accordance with a predetermined condition on the basis of a determination result of the road surface state.

\* \* \* \* \*